Nov. 26, 1929.　　P. E. MAHAFFEY　　1,737,467
BELT TIGHTENER
Filed Nov. 14, 1928　　2 Sheets-Sheet 1

WITNESSES

INVENTOR
Paul E. Mahaffey
BY
ATTORNEY

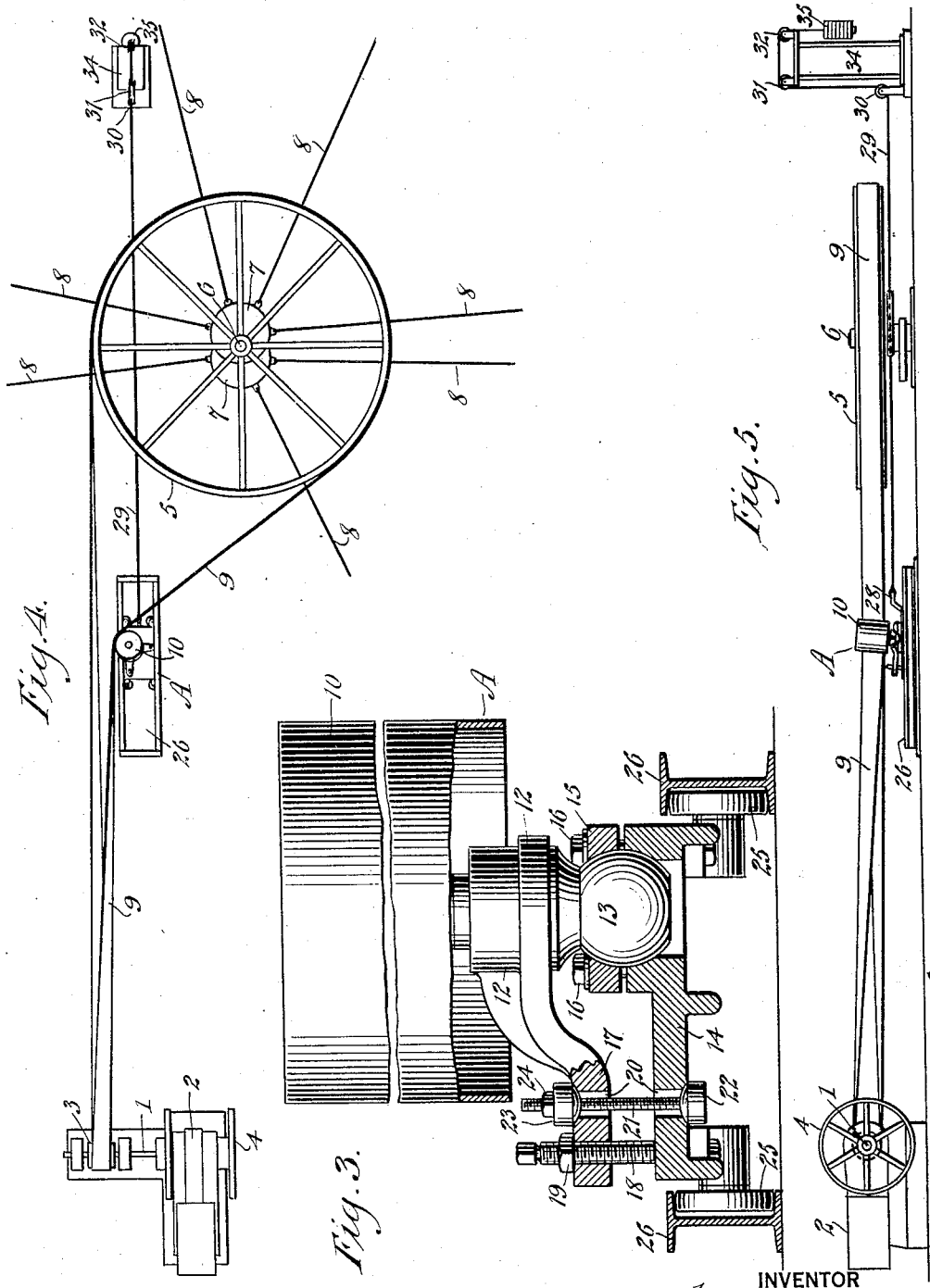

Patented Nov. 26, 1929

1,737,467

UNITED STATES PATENT OFFICE

PAUL E. MAHAFFEY, OF TULSA, OKLAHOMA

BELT TIGHTENER

Application filed November 14, 1928. Serial No. 319,383.

This invention relates to belt tighteners and has more particularly to do with an improved tightener automatically operated by a weight to hold the belt or band of the power unit properly taut.

This invention is more specifically adapted for use in connection with the operating of multiple oil wells from a central power unit, and in this art an endless belt is known as an "endless band" and the driven pulley as a "band wheel", but for convenience of description and to avoid repetition the terms "belt" and "pulley" will be hereinafter employed as it is of course obvious that the invention might be adapted for other uses than that specifically stated.

An object of the invention is to provide an automatically drawn or movable belt tightener movable in a path parallel to the tight strand of the belt.

A further object is to provide a belt tightener involving a pulley and an improved mounting therefor with a weight or its equivalent, such as a spring for example, to exert a predetermined pull or pressure thereon to hold the belt tight.

With these and other objects in view, the invention consists in certain novel features of construction and combinations and arrangements of parts, which will be more fully hereinafter described and pointed out in the claims.

In the accompanying drawings—

Figure 3 is a view in transverse section on the line 3—3 of Figure 1;

Figure 4 is a top plan view of a power unit showing my improved belt tightener in operative positions;

Figure 5 is a view in side elevation of Figure 4.

Figure 1:
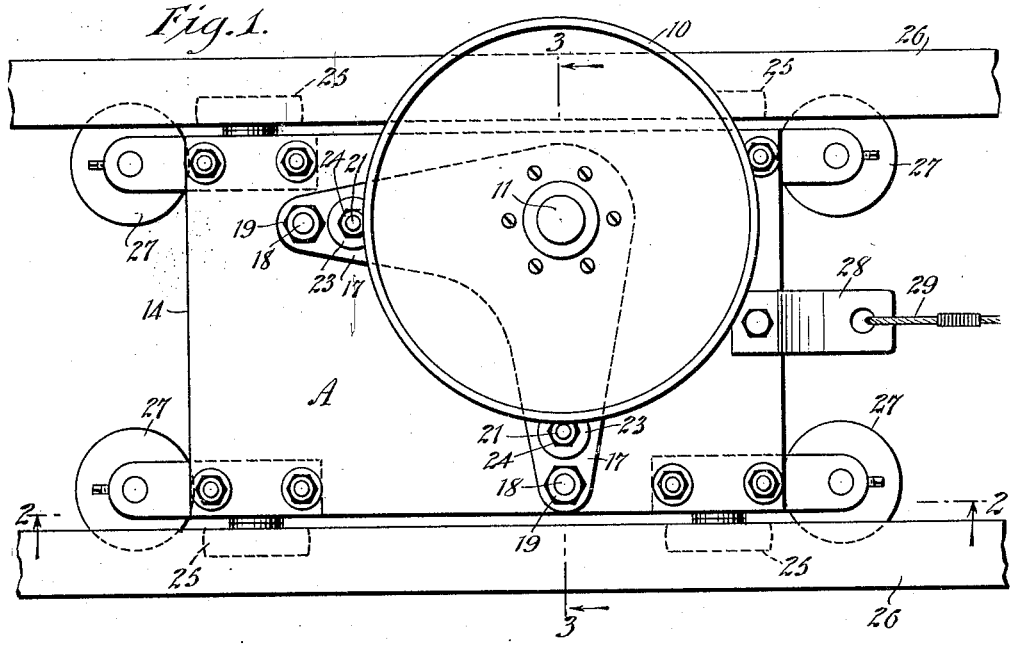
Figure 1 is a top plan view of my improved belt tightener.
Figure 2:
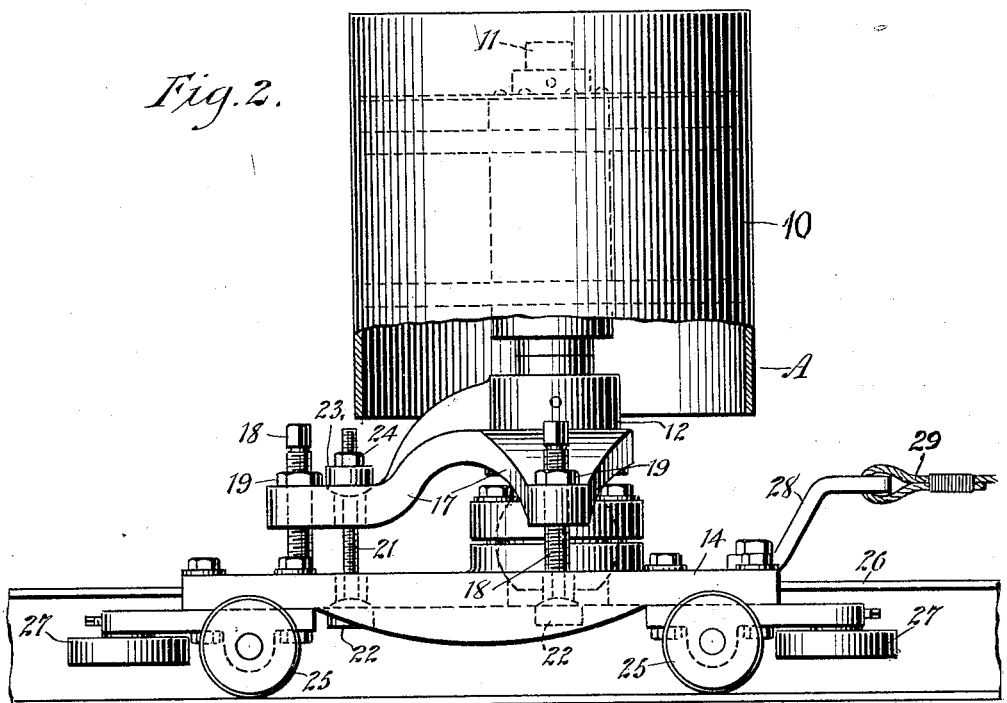
Figure 2 is a view in side elevation of the belt tightener, portions of the construction being broken away and in section.

The general assemblage illustrated in Figures 4 and 5 of the drawings includes a power shaft 1 which is driven by an engine or motor 2 and supports a drive pulley 3, and said shaft is preferably provided with a balance wheel 4.

5 represents the driven pulley which is known in the art as a band wheel and is appreciably larger in diameter than the drive pulley 3. This driven pulley 5 is fixed to a vertical shaft 6 carrying eccentrics 7 operating pitmen or pull rods 8 connected to the several oil well pumping jacks.

9 is the endless belt or band which is positioned around the drive pulley 3 and driven pulley or wheel 5, and these pulleys are so disposed that one run of the belt 9 is straight with the exception of a twist therein to accommodate itself to the positions of the pulley, and the other run of the belt is engaged by a pulley 10 of my improved belt tightener, which is indicated generally by the reference character A.

The pulley 10 is mounted on a shaft or axle stud 11 secured on a bracket 12, and this bracket 12 has a ball 13 thereon in line with the shaft or axle stud 11 and is mounted in a socket formed partially in a baseplate 14 and a cap (or collar) 15 is secured to the baseplate by bolts or screws 16.

The bracket 12 above referred to has a plurality of arms 17 projecting therefrom and disposed at an angle, and while I do not wish to be limited to the specific number of these arms I have shown two arms, and these are all that are necessary for practical purposes.

The arms 17 carry set screws 18 at their outer ends which bear against the baseplate 14 and have nuts 19 thereon to secure the screws against accidental turning movement. The arm 17 and the baseplate 14 have alined openings 20 therein through which adjusting screws 21 are projected. These screws 21 have heads 22 at one end and are provided with adjusting collars 23 at their other end with nuts 24 on the screws engaging the collars.

The engaging faces of the heads 22 and collars 23 with the baseplate 14 and the arm 17, respectively, are rounded or curved so that a somewhat ball and socket action is had so that the screws 21 are capable of slight angular movement in the openings 20 which are appreciably larger than the screws and allow the arms to be drawn down toward the plate 14 as desired to give the proper angular disposition to the pulley 10, as may be desired.

The baseplate 14 is supported by four vertically positioned rollers 25 engaging the flanges of I beams 26 the channels constituting a track, and said baseplate 14 also carries four horizontally positioned rollers 27 engaging the web of the track 26 so that the pulley mounting may have a free movement in the track but is held against displacement in any other direction.

A bracket 28 is fixed to the baseplate 14 and has a cable or other connecting device 29 secured thereto, and this cable 29 is passed over a series of idle pulleys 30, 31 and 32 on an upright 34, and a weight 35 is secured to one end of the cable or other flexible connecting device 29 and exerts a constant and predetermined pull on the plate 14 and the pulley 10 carried thereby.

I would call particular attention to the fact that the tracks 26 are so positioned that the pulley 10 moves parallel with the tight strand of belt 9, and as the drive pulley 3 and the driven pulley 5 are at right angles to each other it is necessary that both runs of the belt have a twist therein, and by reason of the belt supporting mechanism above described the pulley can be given an exact angular disposition to accomplish the result desired.

A belt tightener of this character holds the angular run of the belt throughout the major portion of its length in a plane parallel with the straight run of the belt so that in all of its positions of movement the drive pulley 3 has the same frictional engagement with the belt and the movement of the tightener toward or away from the driven pulley causes a variation in the surface engagement of the driven pulley with the belt.

Thus we have the effect of the belt tightener maintaining a constant frictional engagement of the belt with the drive pulley with a variable engagement with the driven pulley so that as the tightener moves toward the driven pulley the frictional engagement of the driven pulley with the belt is increased and a maximum of power transmission is had.

It is to be understood that under the law a spring and a weight are always considered equivalents, and the expression hereinafter in the claims of a "weight" is used in its broadest sense to include a spring or other equivalent.

While I have illustrated what I believe to be a preferred embodiment of my invention it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A belt tightener, including a baseplate, a bracket having ball and socket adjustable engagement with the baseplate, a shaft or stud secured in the bracket, a pulley on said shaft adapted to engage the run of an endless belt, arms on said bracket at an angle to each other, means adjustably securing said arms relative to the baseplate to secure the pulley at the desired angle, and a weight exerting a constant and predetermined pull on said plate.

2. A belt tightener, including a baseplate, a bracket having ball and socket adjustable engagement with the baseplate, a shaft or stud secured in the bracket, a pulley on said shaft adapted to engage the run of an endless belt, arms on said bracket at an angle to each other, means adjustably securing said arms relative to the baseplate to secure the pulley at the desired angle, a parallel flanged track, and wheels on said plate engaging the flanges of the track and the webs of the track and guiding the movement of the plate and pulley.

PAUL EDWARD MAHAFFEY.